United States Patent [19]

Sparling et al.

[11] Patent Number: 5,333,915
[45] Date of Patent: * Aug. 2, 1994

[54] COUPLING

[76] Inventors: Fred Sparling, 122 Waterford Bridge Road, St. John's, Newfoundland, Canada, A1E 1C9; Wilfred Maloney, 25 Cotton Street, Gander, Newfoundland, Canada, A1V 1E3

[ * ] Notice: The portion of the term of this patent subsequent to Feb. 9, 2010 has been disclaimed.

[21] Appl. No.: 973,007

[22] Filed: Nov. 5, 1992

Related U.S. Application Data

[63] Continuation-in-part of Ser. No. 765,090, Sep. 25, 1991, Pat. No. 5,184,851.

[51] Int. Cl.⁵ .............................................. F16L 33/00
[52] U.S. Cl. .......................................... 285/73; 285/69; 285/78; 285/79
[58] Field of Search ................. 285/73, 72, 79, 84, 285/85, 69, 76, 77, 78, 87

[56] References Cited

U.S. PATENT DOCUMENTS

| 898,017 | 9/1908 | Steen . | |
|---|---|---|---|
| 953,061 | 3/1910 | Ruland . | |
| 1,112,850 | 10/1914 | Sherer . | |
| 1,857,420 | 5/1932 | Wolford | 285/85 |
| 1,860,038 | 9/1931 | Lange . | |
| 2,132,506 | 10/1938 | Allen | 285/73 |
| 4,643,459 | 2/1987 | Carson | 285/84 |
| 5,143,286 | 9/1992 | Hansen et al. | 285/314 |
| 5,184,851 | 2/1993 | Sparling | 285/314 |

FOREIGN PATENT DOCUMENTS

| 189092 | 3/1919 | Canada . |
|---|---|---|
| 261871 | 6/1926 | Canada . |
| 2004975 | 8/1989 | Canada . |

*Primary Examiner*—P. Austin Bradley
*Assistant Examiner*—Jeffrey T. Knapp
*Attorney, Agent, or Firm*—Wenderoth, Lind & Ponack

[57] ABSTRACT

A coupling half designed to mate with an identical coupling half to form a coupling for interconnecting sections of hose or the like, has a tubular body having at one end a projecting tooth and a complementary socket arrangement constituted by a plurality of uniformly spaced arcuate connector teeth axially outstanding from the tubular body and terminating in a radially inwardly directed arcuate protrusion, a plurality of radially outwardly directed arcuate ribs circumferentially aligned with the teeth, and a plurality of tooth entrance ways located circumferentially between each of the ribs and each of the teeth, a resiliently biased detent locking device in the body biased towards an advanced position, and an annular detent unlocking ring angularly rotatable on the body and resiliently biased in one direction of rotation to an inoperative position and being angularly movable in the opposite direction to an active position wherein it engages the detent locking means to retract it away from the advanced position.

5 Claims, 9 Drawing Sheets

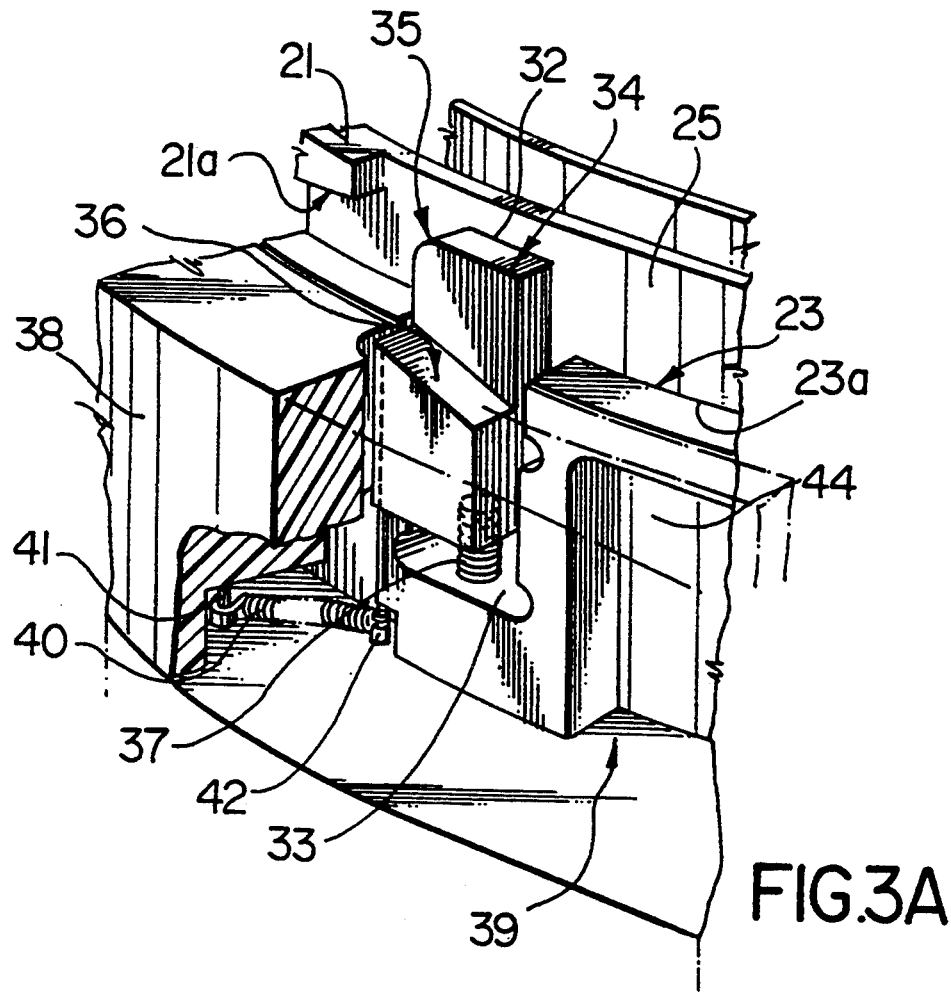
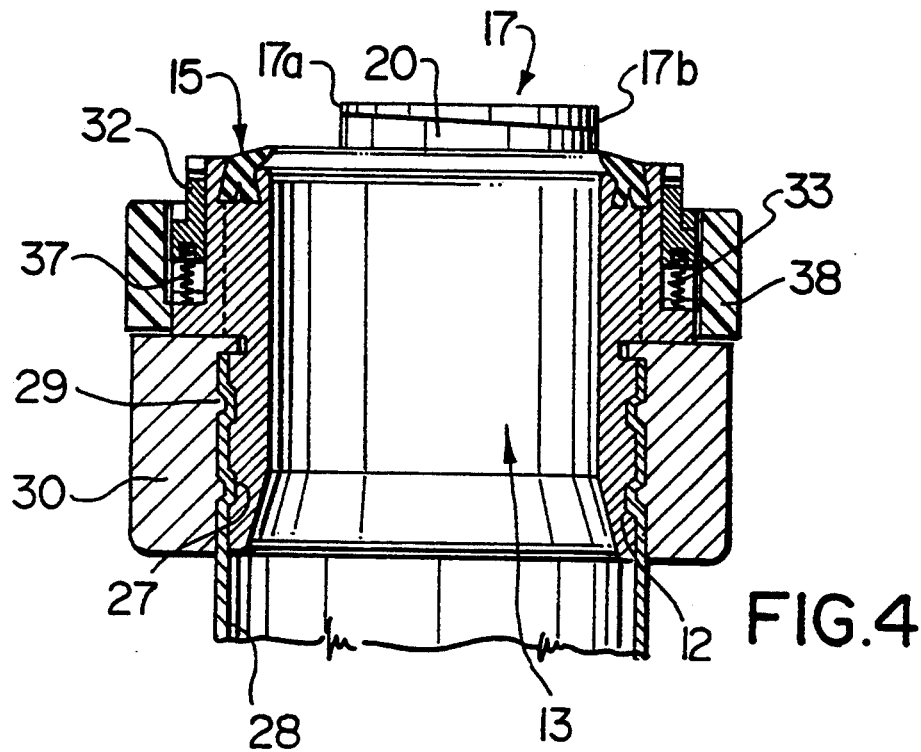

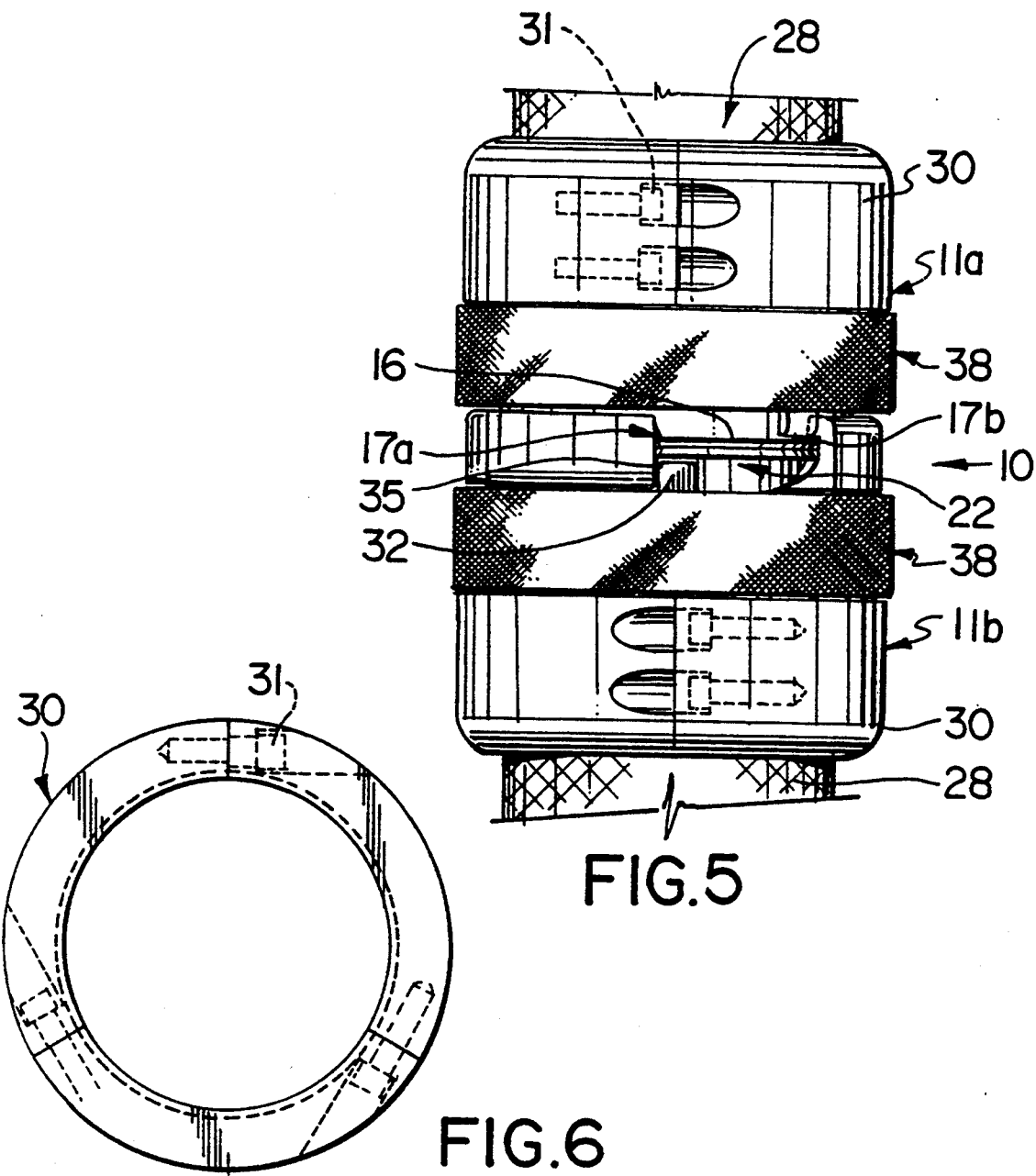

COUPLING

BACKGROUND OF THE INVENTION

This application is a continuation-in-part of our co-pending U.S. Application Ser. No. 07/765,090 filed on Sep. 25, 1991, now U.S. Pat. No. 5,184,851.

The present invention relates to a coupling half for a quick-connect coupling such as a hose coupling.

The advantages, especially for fire-fighting where time is very important, of being able quickly to connect together water carrying members has long been known and there are several designs for couplings that, with one quarter turn, or less, of two interacting coupling halves, create a watertight seal between two water carrying members such as hoses, valves, nozzles etc. Such couplings may be said to fall within one of two categories: 1) "male and female"; and 2) "identical", sometimes called "sexless", couplings. Identical couplings have the advantage that any coupled end of any water carrying member may be presented for connection to any other of the same type. The present invention relates to a coupling of the identical type.

There is on the market an identical coupling known as a "Storz* Coupling" in which the coupling halves each have a cam ring which is rotatable relative to the associated hose connection piece and whose cams engage in a bayonet-type locking engagement with grooves of the cam ring of the other respective coupling half. The grooves, which are annular in form, have a slope and the turning of the cam rings causes the hose connection halves to draw together axially. An example of such coupling is seen in U.S. Pat. No. 4,524,997 issued to Ebert Jun. 25, 1985. Although this general type of coupling has received wide usage it poses certain disadvantages in operation, particularly the problem inherent in all quick connect couplings—that of potential unintentional de-coupling. De-coupling forces may arise as a result of water-pressure induced torque or as a result of the manoeuvring of hose or other fire-fighting equipment. With the Storz coupling, the cam rings are built such that when rotationally engaging the two coupling halves maximum compression of the mating seals upon the face of each coupling half is achieved when the coupling is rotated through the first part of it's rotational range. Thereafter, as rotation is continued to it's limit, because the grooves of the engaging cam rings are then reverse sloped, the coupling halves will move slightly away from each other axially and allow the seals to de-compress partially. The coupling will then resist de-coupling by making it necessary to both compress the seals and to rotate them in opposite directions against their compressed contact before de-coupling can take place. The disadvantage of this type of coupling is that it is difficult to rotationally engage or disengage the coupling halves and, of course, the larger the diameter of the coupling the more the force which is required to engage or disengage it. This design also has the disadvantage that because all the interlocking features are located on the face of the coupling they become hidden from view once the coupling halves are engaged and initially rotated, thus there is no visual reference to indicate whether or not any two engaged coupling halves are fully rotated or not.
*Trade-mark A second type of coupling is marketed by the National Fire Hose Corporation of Compton, California (J. M. Huber, manufacturer) under the name of Staytite* couplings, as seen in the U.S. Pat. No. 4,643,459. These couplings connect with less than a quarter turn and, when fully rotated are automatically locked against rotation by the engagement of a six piece spring-assisted locking plug and locking slide assembly located in each coupling half. This design suffers from practical disadvantages; it is expensive to produce, there is a likelihood of part failure, and it is difficult to repair.
*Trade-mark U.S. Pat. No. 1,112,850, issued on Oct. 6, 1914 to Sherer, shows a hose coupling which has sexless members with circumferentially slotted hooks for interlocking engagement with corresponding studs. Locking pins are also provided with this device to prevent the studs from being withdrawn from their corresponding hooks. The locking pins are normally urged to a protruding position by abutment against the edge of a rotatable collar of the coupling. The rotatable collar provides a series of notches which effect retraction of the locking member. This device uses a threaded and unbiased collar for the couplings, an arrangement which proves to be relatively cumbersome to operate under field conditions.

U.S. Pat. No. 4,643,459 issued on Feb. 17, 1987 to Carson, discloses a coupling half with locking pins which are biased to extend outwardly of the coupling faces, and are retracted during coupling by a ramped end of the sidewall extensions. Further rotation of the coupling members then causes each coupling pin to fall into its corresponding receptacle. To unlock the coupling cammed circumferential slides are activated to retract the pins out of the receptacles. This arrangement proves to be difficult to operate since the locking pins of each half are not maintained in an extended position ready for rapid reattachment and locking of the halves after disconnection. Furthermore, to disconnect the coupling halves the operator must retract the locking pins in a first movement, and then in a second movement proceed to uncouple the two halves of the hose coupling by relative rotation of the one to the other, making rapid disconnect ion difficult.

It is an object of the present invention to provide an improved lock system for a quick-connect coupling. This invention is particularly directed towards the sealable engagement of conduit members which carry pressurized water and more particularly again towards engagement of conduit members of a large diameter which are difficult to manoeuvre and lock. No special knowledge of coupling hoses is required to use the coupling halves of the present invention. This can be particularly advantageous in field conditions where untrained volunteer fire-fighters may be used.

SUMMARY OF THE INVENTION

The invention provides a coupling half designed to mate with an identical coupling half to form a coupling for interconnecting sections of hose or the like, said coupling half comprising: a tubular body having at one end a projecting tooth structure and a complimentary socket arrangement comprising a plurality of uniformly spaced arcuate connector teeth axially outstanding from the tubular body and terminating in a radially inwardly directed arcuate protrusion, a plurality of radially outwardly directed arcuate ribs circumferentially aligned with said teeth, and a plurality of tooth entrance ways located circumferentially between each of said ribs and each of said teeth; detent locking means associated with said socket arrangement being mounted in said body to be moveable towards and away from an advanced position, and being resiliently biased towards said advanced position; detent unlocking means comprising an annular ring supported on said body to be angularly rotatable thereon, said ring being resiliently biased in one direction of rotation to an inoperative position and being angularly moveable in the opposite direction to an active position wherein it engages the detent locking means to retract it away from said advanced position; the arrangement being such that one said coupling half is connect able to an identical coupling half by interengagement between the complimentary tooth structures and socket arrangements to form the coupling with each of said locking detent means automatically moving to its advanced position to block disengagement from the socket arrangement of the tooth structure of the opposed coupling half; disengagement of the two coupling halves requiring angular rotation of each of said annular rings in opposite direct ions.

The invention also provides a coupling half designed to mate with an identical coupling half to form a coupling for interconnecting sections of hose or the like, said coupling half comprising: a tubular body having at one end a projecting tooth structure and a complimentary socket arrangement comprising a plurality of uniformly spaced arcuate connector teeth axially outstanding from the tubular body and terminating in a radially inwardly directed arcuate protrusion, a plurality of radially outwardly directed arcuate ribs circumferentially aligned with said teeth, and a plurality of tooth entrance ways located circumferentially between each of said ribs and each of said teeth; detent locking means associated with said socket arrangement being mounted in said body to be moveable towards and away from an advanced position and a means for moving said detent locking means toward the advanced position; detent unlocking means comprising an annular ring supported on said body to be angularly rotatable thereon, said ring being resiliently biased in one direction of rotation to an inoperative position and being angularly moveable in the opposite direction to an active position wherein it engages the detent locking means to retract it away from said advanced position; the arrangement being such that one said coupling half is connect able to an identical coupling half by interengagement between the complimentary tooth structures and socket arrangements to form the coupling with each of said locking detent means automatically moving to its advanced position to block disengagement from the socket arrangement of the tooth structure of the opposed coupling half; disengagement of the two coupling halves requiring angular rotation of each of said annular rings in opposite directions.

In one particularly useful embodiment of this invention the detent locking means is preferably provided by an upwardly biased locking tab supported in the outer periphery of the coupling half, and operable when the two coupling halves are coupled to automatically engage behind the trailing edge of the projecting tooth of the opposing coupling half. The locking tab is also provided with a ramp face which is in operative communication with the detent unlocking means such that when the coupling halves are in a coupled position, the annular rings of the detent unlocking means can be rotated such that inclined faces on the interior of the rings cooperatively engage the inclined tab faces so as to withdraw the tabs and permit relative uncoupling rotation of the two coupling halves.

In another particularly useful embodiment of this invention the detent locking means is preferably provided by an upwardly biased locking pin supported in at least one of the connector teeth and operable when the two coupling halves are coupled to automatically engage an aperture in the complimentary socket of the opposing coupling half.

BRIEF DESCRIPTION OF THE DRAWINGS

The following is a description, by way of example, of the preferred embodiments of the present invention, reference being had to the accompanying drawings in which:

FIG. 3a is a detailed perspective view, partly in section, of the coupling half locking tab and collar;

FIG. 4 is a sectional view taken on the lines IV—IV of FIG. 2;

FIG. 5 is a side view of two coupling halves assembled into the coupling;

FIG. 6 is a plan view which shows a three-piece clamp ring which surrounds the base of the coupling half;

DESCRIPTION OF THE PREFERRED EMBODIMENT

Figure 15:
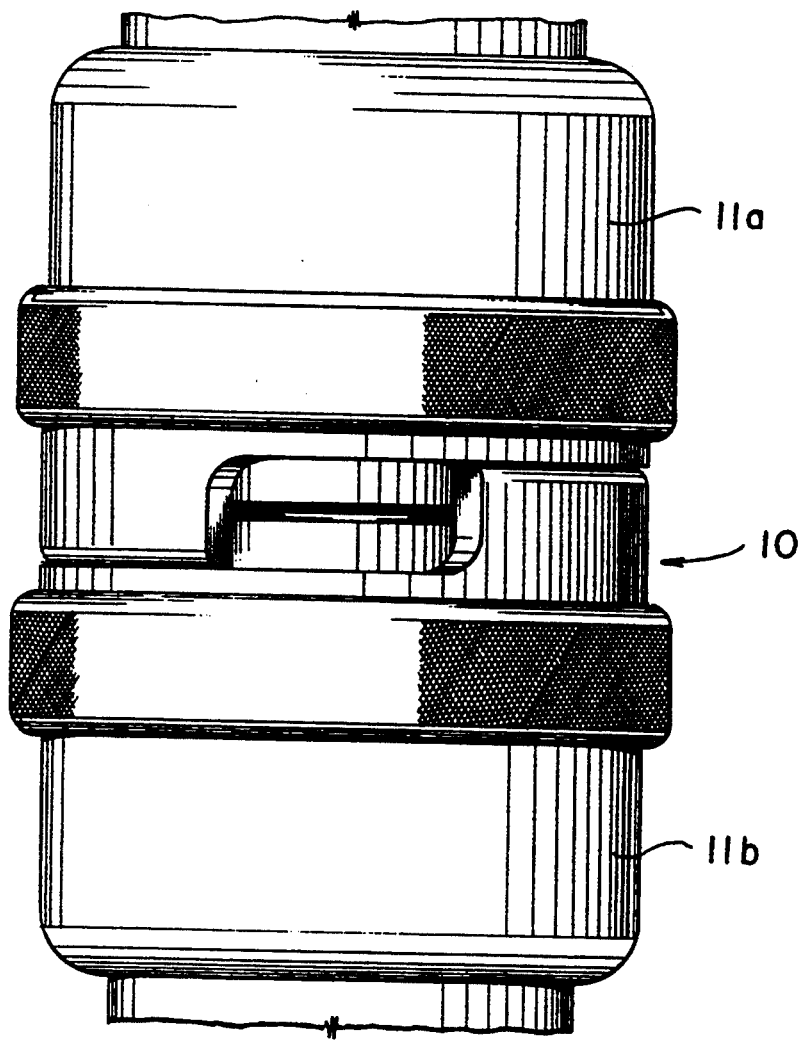
FIG. 15 is a side view of two coupling halves shown in FIG. 10 assembled into the coupling.

As is illustrated in FIGS. 5 and 15, a coupling 10 is formed of two identical coupling halves 11a and 11b. Each coupling half (see FIGS. 4 and 12) is formed from a generally tubular body 12 with a smoothly bored interior 13. The tubular body is preferably cast or machined from a lightweight material such as aluminum.

Figure 1:
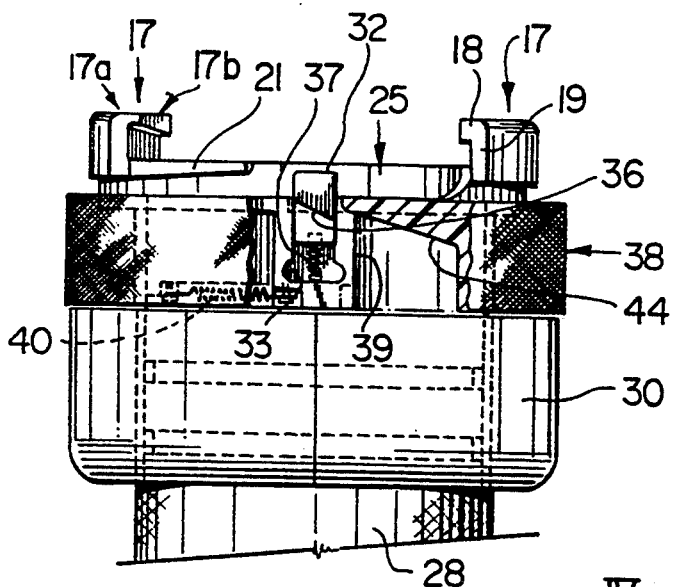
FIG. 1 is a partially sectioned side view of the first embodiment of one coupling half.
Figure 3:
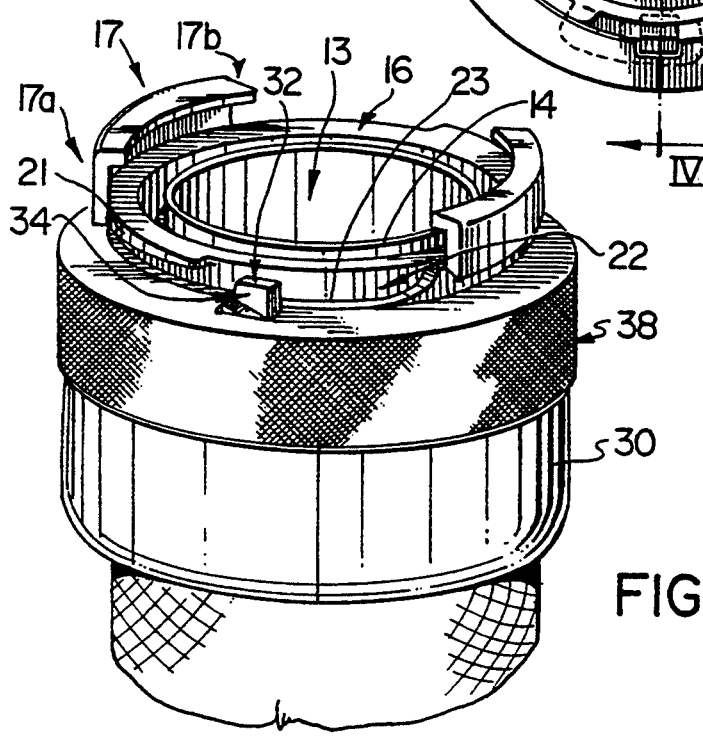
FIG. 3 is a perspective view of the coupling half.
Figure 7:
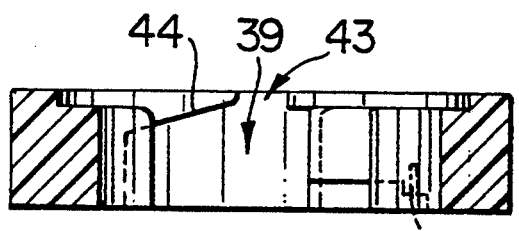
FIG. 7 is a sectional side view taken on the line VII—VII of FIG. 8 of a release collar of the coupling half.
Figure 8:
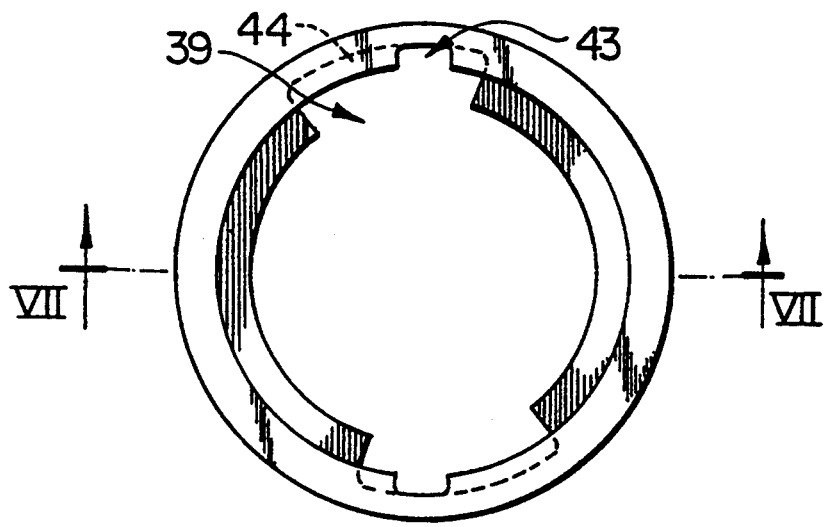
FIG. 8 is a top plan view of the collar illustrated in FIG. 7.
Figure 9:
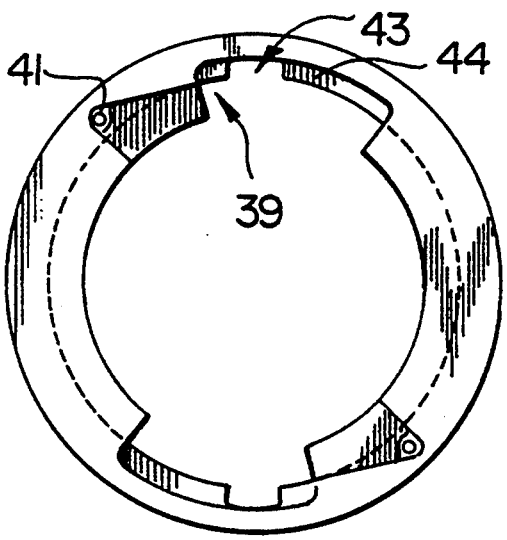
FIG. 9 is a bottom plan view of the collar illustrated in FIG. 7.

In a first embodiment, at the top portion of the body 12 the perimeter of bore 13 is surrounded by an annular top face 16 having a grooved channel 14 into which a resilient seal 15 is placed. Extending axially from the face 16 of the body 12 are two opposed arcuate connector teeth 17 which are of a generally inverted "L-shape" in profile. The top limb 18 and side limb 19 of each inverted "L-shaped" tooth 17, together with face 16, define an arcuate tapered groove 20, as best seen in FIGS. 1, 3 and 4, which tapers in height along the tooth from what hereinafter is referred to as the leading end 17a to the trailing end 17b of the tooth 17. Circumferentially aligned and spaced below and radially inwardly of each tooth 17, the sidewall 22 of body 12 carries two outwardly directed arcuate flange-like ribs 21. Spaced below the teeth 17 and surrounding the side wall 22 of the body 12 there is an integral collar 23 with an upper face 23a. The ribs 21, together with the side wall 22 and face 23a define a second tapered groove 24 which tapers in height from the leading end 21a of rib 21. A pair of arcuate tooth entrance ways 25 are each defined by a circumferential gap, of a generally lesser arc than the connector teeth 17, between the leading end 21a of rib 21 and the trailing end of the opposed tooth 17.

Figure 2:
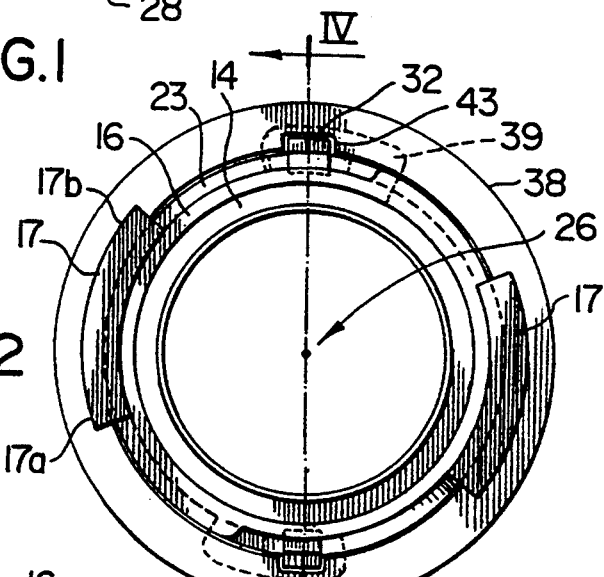
FIG. 2 is a plan view of that coupling half.

In a plane normal to the longitudinal axis 26 (FIG. 2) of the coupling half 11 the arcuate connector teeth 17 each subtend an angle of about 62°, the arcuate ribs 18 each subtend and angle of about 53° and the entrance ways 25 each subtend an angle of about 65°.

The bottom portion of body 12 (see FIG. 4) has a cylindrical surface 27 which receives the end of a flexible hose 28 and is formed with a series of grooves 27a which co-operate with corresponding ribs 29 of a three-piece surrounding clamping ring 30 (see FIG. 6) to affix the hose to the body and to form a leak proof connection. The three pieces of the clamping ring 30 are releasably connected by recessed capscrews 31 which also permit the ring to be adjusted to accept different thicknesses of hose to be attached over the bottom portion of the body 12.

On the outer periphery of body 12 there are a pair of recessed axial channel guides 33 which open from the face 23a of integral collar 23 and which are each located within one of the entrance ways 25, between the leading end of arcuate rib 21 and opposed tooth 17. A locking tab 32 is carried on a generally rectangular body 34 and is mounted in each channel guide 33. The tab 32 has a smoothly rounded tailing edge 35 and is of generally the same thickness as integral collar 23. Extending outwards from the tab 32 the rectangular body has a ramp face 36 that slopes upwardly, as best seen in FIG. 3a. The tab 32 is movable in the axial direction within the channel guide 33 and is upwardly biased by a compression spring 37 which is placed between the bottom wall of channel guide 33 and the bottom of body 34.

Surrounding the outer periphery of the middle portion of body 12 and adjacent the ring 30 and the integral collar 23 is an annular ring that forms a rotatable collar 38. The collar 38 is preferably made from a plastic or similar material. As best seen in FIGS. 3a and 7 to 9 the collar 38 has two diametrically opposed cavities 39 opening from its inner cylindrical surface and each receiving one of said tabs 32 with clearance so as to permit limited angular movement of the collar 38 circumferentially around the body 12 and between what will hereinafter be referred to as an inoperative position and an operative position. Within each cavity is a tension spring 40 connected at one end to a pin 41 formed on collar 38 and at the other to a pin 42 located adjacent the corresponding channel guide 33 on body 12. The spring 40 resiliently biases the collar 38 in the inoperative position. Each cavity opens to the top face of the collar 38 through a slot 43 that is aligned radially with the upper edge of ramp face 36. In each cavity 39 there is an inclined collar ramp face 44 (FIG. 1) which extends from the edge of slot 43 to oppose and cooperate with ramp face 36. The arrangement of the faces 36 and 44 is such that their lower edges overlap slightly in the operative position.

In order to quick connect the two coupling halves 11a and 11b they are placed in axially aligned position with the teeth 17 of each coupling half facing the entrance ways 25 of the opposing coupling half. As the two coupling halves are moved axially together, the teeth 17 initially move into the entrance 10 ways 25 and then meet and depress the locking tabs 32. The two coupling halves may then be rotated relative to one another. Initially there is clearance between the leading edge of tooth 17 and the leading edge of the opposed rib 21. As rotation of the coupling halves is continued toward the fully engaged position, the clearance narrows and faces 18a and 21a engage, drawing the two coupling halves axially together. In the process the seals 15 provided in channel 14 of each coupling half are compressed against one another. In this way the teeth 17, entrance ways 25 and ribs 29 of the two coupling halves form a tooth and complimentary socket arrangement.

As the two coupling halves are rotated to the fully engaged position, in approximately one sixth of a turn, the trailing ends of the teeth 17 pass over the locking tabs 32, which are then released and able to move upwardly under the force of spring 37 to an active (advanced) position so as to automatically engage behind the trailing end of the associated connector tooth 17 of the opposing coupling half as seen in FIG. 5. This provides a type of locking detent which locks the coupling halves in the engaged position and prevents them from rotating to unlock. The operator may be sure that the two coupling halves are locked since the tabs 32 are clearly visible when in the advanced position, and also make an audible "click" sound when engaging.

In order to disconnect the two coupling halves 11a and 11b the tabs 32 are retracted to an inactive position by rotating each of the collars 38 from the inoperative to the operative position. As the collar 38 is rotated, the inclined collar face 44 fully engages with the face 36, rides over it, and pushes the tab 32 down the channel guide 33 with a camming motion. This provides a type of detent unlocking means. Once the locking tabs 32 of each coupling half are retracted, it is possible to unlock the two coupling halves by rotating the coupling halves by continuing the rotational force upon the collars, since when each collar reaches its full extent of t ravel in the operative position, the rotational force applied to each collar is then transferred to the coupling half. Furthermore, as the collar is resiliently biased by means of spring 40, when the collar is released it returns to the inoperative position with the locking tabs 32 biased upwardly, in the active position, ready for rapid re-engagement with a second coupling half.

Figure 10:
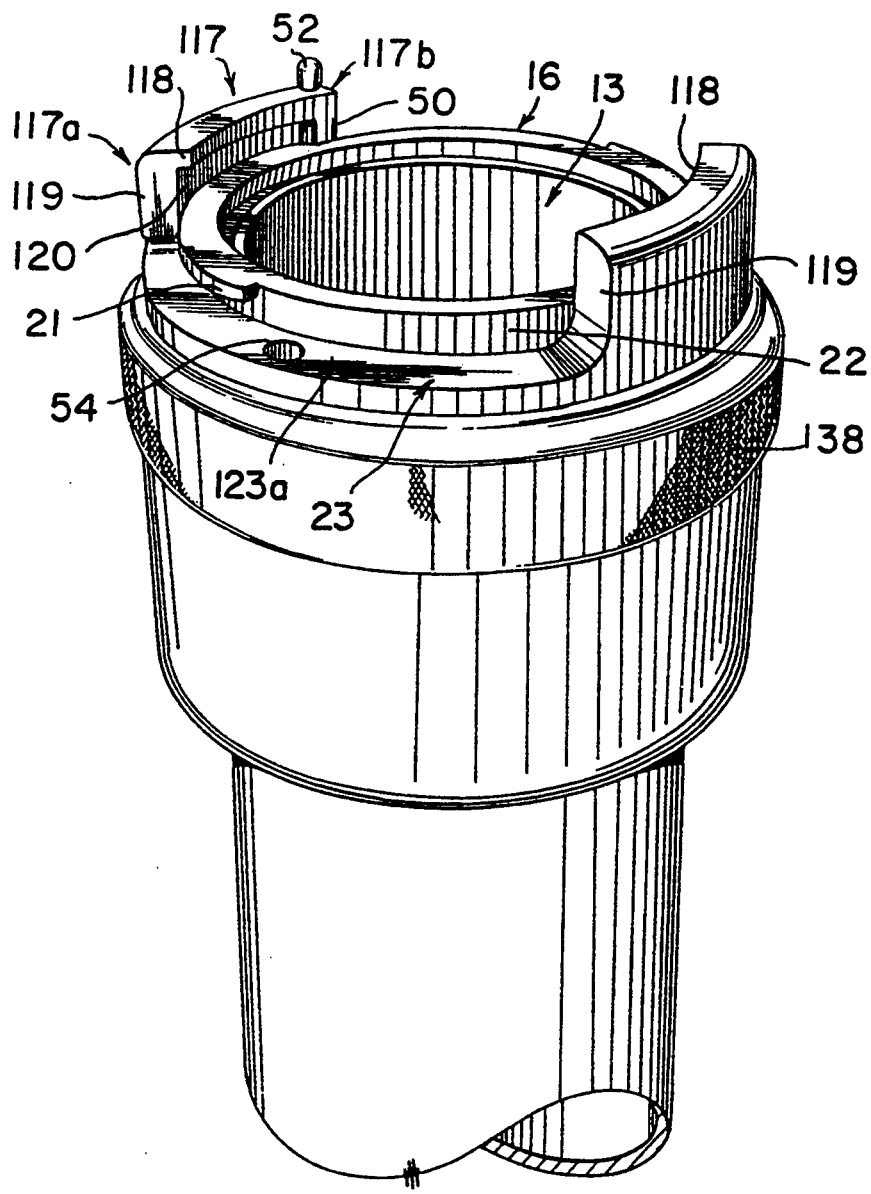
FIG. 10 is a perspective view of a modified form of the coupling half as shown in FIG. 1.
Figure 11:
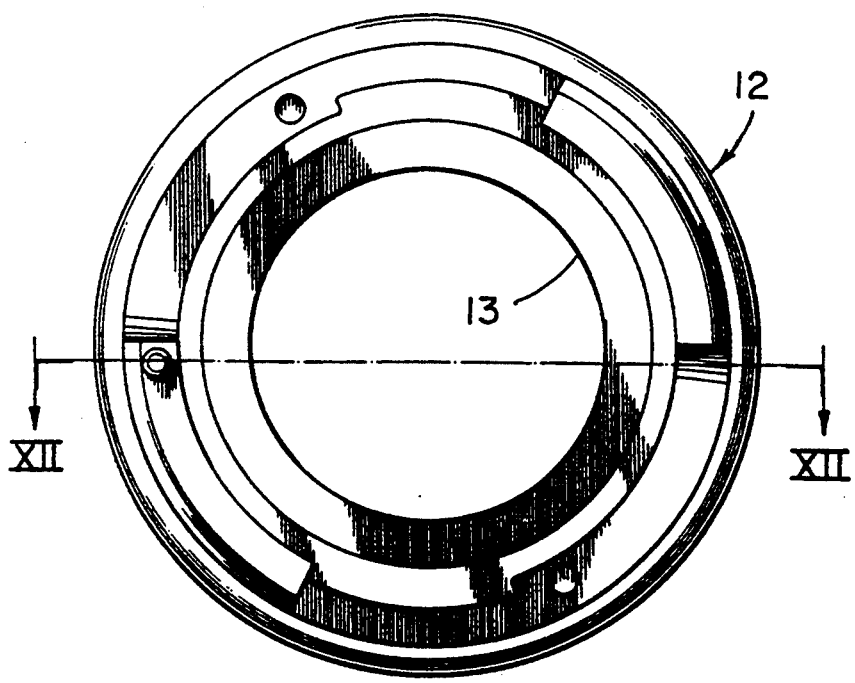
FIG. 11 is a plan view of the coupling shown in FIG. 10.

In the embodiment of the invention illustrated in FIGS. 10 to 16 certain of the structural components are the same or substantially the same, as those previously described and are indicated by the same reference numerals. In this modification two opposed arcuate connector teeth 117, extend axially from the face 16 of body 12. The connector teeth 117 are again of a generally inverted "L-shape" in profile and comprise top limb 118 and side limb 119 and which together with face 16 define an arcuate tapered groove 120, as best seen in FIG. 10, which tapers in height along the tooth from the leading end 117a to the trailing end 117b of tooth 117. However, the groove 120 is closed at the trailing end 117b by limb 50 and a headed locking pin 52 is carried by one tooth 117 on top of limb 118 at the trailing end 117b. Spaced below the teeth 117 and surrounding the side wall 22 of body 12 the upper face 123a of integral collar 23 has an aperture 54 at approximately the midpoint between the trailing end 117b of one tooth and the leading end 117a of the other.

The locking head 56 of locking pin 52 is carried on a shaft 58 and is generally cylindrical with rounded corners on its outer periphery and is of generally lesser diameter than aperture 54 on the upper face 123a to receive locking pin 52.

Figure 12:
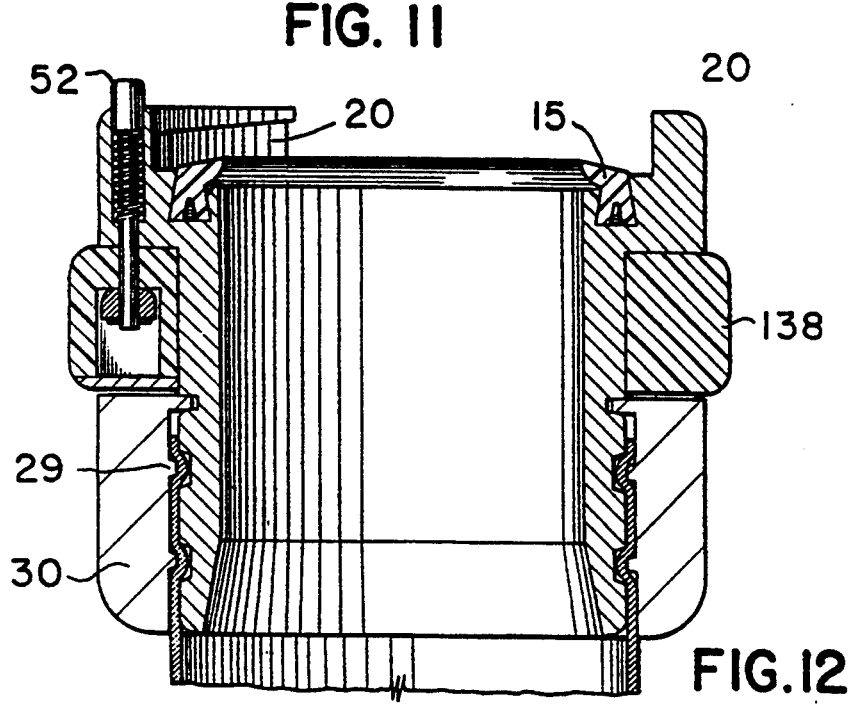
FIG. 12 is a sectional view taken on the lines XII—XII of FIG. 11 showing a locking pin.
Figure 16:
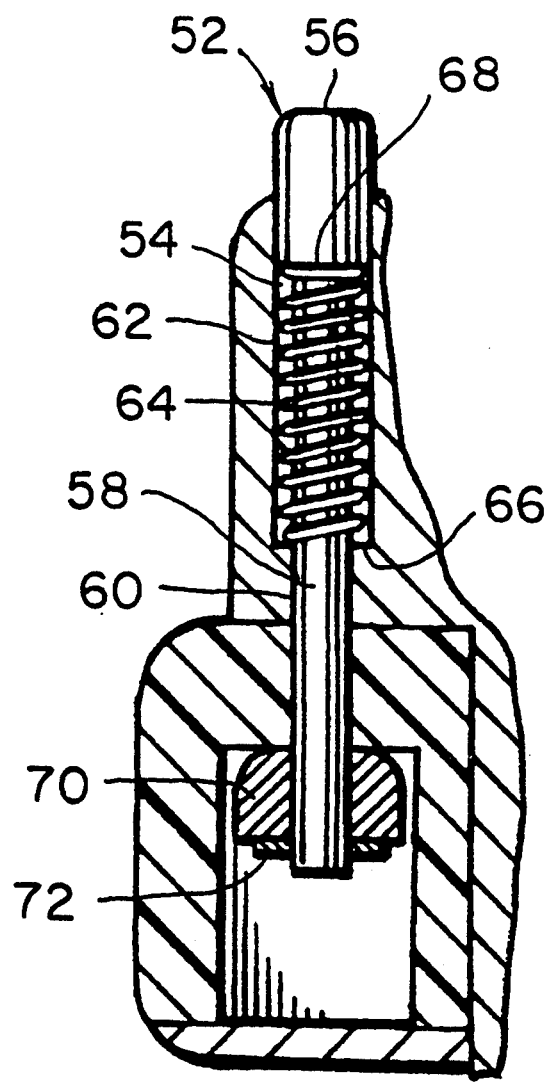
FIG. 16 is a detailed view of the locking pin shown in FIG. 12.

The locking head 56 on shaft 58 is guided for axial sliding movement in a guideway such as bore 60 drilled or otherwise provided in the bottom end of side limb 118 of tooth 117, as best seen in FIGS. 12 and 16. Counterbore 62 formed in the tooth 117 from the top end of limb 118 receive a compression spring 64 which embrace the shaft 58 of locking pin 52 and is confined between the radial shoulder 66 at the end of the counterbore 62 and shoulder 68 on locking head 56 of locking pin 52. The locking head 56 of locking pin 52 is upwardly biased by the compression spring 64 and projects above tooth 117, while the shaft 58 projects below the tooth and carries a collet 70 held in place by split retaining ring 72 seated on shaft 58. Locking pin 52 has a sliding fit in the counterbore 62 to guide the axial movement of the pin.

Figure 13:
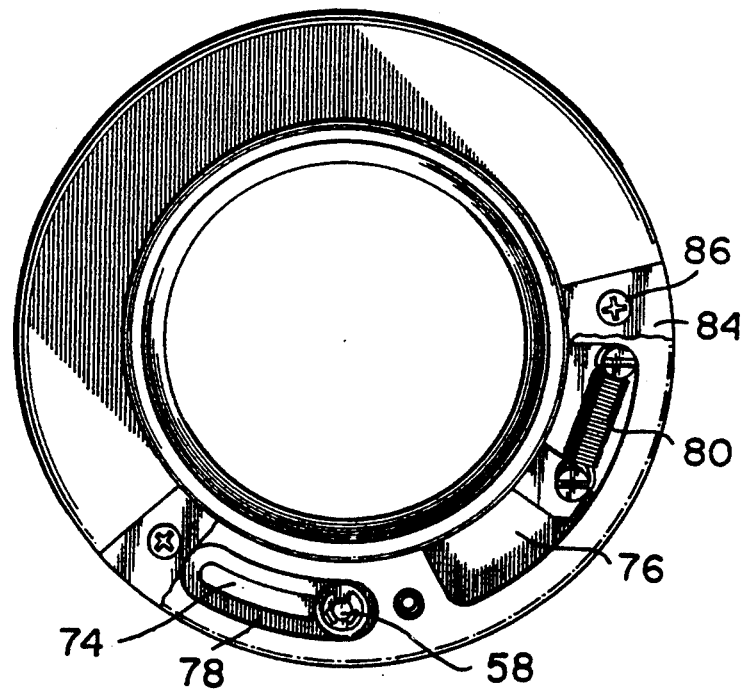
FIG. 13 is a bottom plan view of the coupling shown in FIG. 10 with the clamping ring removed.
Figure 14:
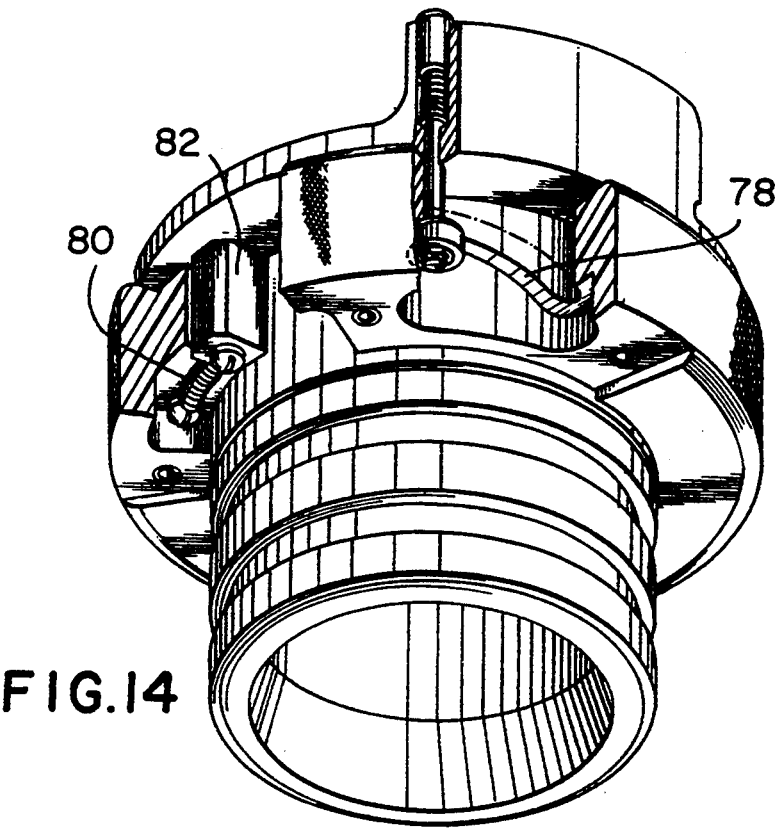
FIG. 14 is a detailed perspective view, partly in section, of the coupling half shown in FIG. 10, showing the locking pin and collar.

Surrounding the outer periphery of the middle portion of body 12, between integral ring 23 and ring 30, is an annular ring that forms a rotatable collar 138. As best seen in FIGS. 12, 13, and 14, the collar 138 has a slot 74 and a cavity 76 within its inner cylindrical surface. The slot 74 is a generally elongate oval and receives shaft 58 with clearance so as to permit limited angular movement of the collar 138 circumferentially around the body 12 and between the inoperative and operative positions. Formed within slot 74 there is an inclined ramp shoulder 78 which surrounds shaft 58 to oppose and co-operate with stud 70 mounted on the shaft 58. In cavity 76 there is a tension spring 80 which is fastened to the wall of the collar 138 and a lug 82 on the periphery of body 12 to resiliently bias the collar 138 in the inoperative position. When ring 30 is removed, the slot 74 and cavity 76 are accessible through access plate 84 which is held in place by screws 86, as best seen in FIG. 13.

The two coupling halves are engaged for coupling as previously described, or substantially so. In this embodiment, however, as the two coupling halves 11a and 11b are moved axially together, the locking pins 52 of each half which are carried on teeth 117 meet with the face 123a and are depressed into the counterbore 62. The two coup-ling halves may then be rotated one to the other as previously described. As the two coupling halves are rotated to the fully engaged position, in approximately one sixth of a turn, the locking heads 56, carried on the trailing end of teeth 117b pass along faces 123a and the locking pins will come into register with the apertures 54 so that the springs 64 will automatically urge the pins 52 and locking heads 56 into the apertures 54 to an active (advanced) position. This again provides a type of locking detent which locks the coupling halves in the engaged position and prevents them from rotating to unlock. The operator may be sure that the two coupling halves are locked since there is an audible "click" sound.

In order to disconnect the two coupling halves 11a and 11b of this embodiment, the locking heads 56 are retracted to an inactive position by rotating each of the collars 138 from the inoperative to the operative position. As the collar 138 is rotated, the inclined ramp shoulder 78 engages the stud 70 which rides along the shoulder and pulls shaft 58 of pin 52, and thus head 56, into the counterbore in tooth 117 with a camming motion. This provides a type of detent unlocking means. Once the locking heads 56 of each coupling half are retracted, it is possible to unlock the two coupling halves as previously described. Again, because the collar is resiliently biased by means of spring 80, when the collar is released it returns to the inoperative position with the locking head 68 biased upwardly, in the active position, ready for rapid re-engagement with a second coupling half.

As each of the two coupling halves of the embodiments described above are identical, when joined it is necessary to simultaneously exert rotational force upon each collar in an opposite direction. This type of arrangement is particularly useful in situations where a coupled hose is to be manoeuvred across the ground, by pulling it, since the tendency to uncouple due to external forces is minimized. This is because any frictional motion which might cause one of the collars to rotate, and thus retract one locking tab or locking pin, as the case may be, would simultaneously exert an opposite effect on the opposed collar.

As shown and described in the first embodiment there are two teeth 17, two entrance ways 25, two ribs 29, and two tabs 32 on each coupling half 11a and 11b. However, the coupling and locking system would function equally as well if only one tab 32 were provided on each coupling half 11a and 11b, or if a different number of teeth 17, entrance ways 25 and ribs 29 were used.

Again, as shown and described in a second embodiment there is one locking head 60 on each coupling half 11a and 11b. However, it will be understood that the coupling and locking system would function equally as well with two locking heads 56 on each half 11a and 11b, or, as above, if a different number of teeth 117, entrance ways 25 and ribs 29 were used.

What I claim as my invention:

1. A coupling comprising two complementary coupling halves designed to mate with one another for interconnecting sections of hose, each said coupling half comprising:

a tubular body having at one end a projecting tooth structure comprising a plurality of uniformly spaced arcuate connector teeth axially outstanding from the tubular body and terminating in a radially directed arcuate protrusion, and a corresponding socket arrangement comprising a corresponding plurality of arcuate ribs directed in the opposite radial direction to said protrusions at a radius corresponding to that of said teeth, and a plurality of tooth entrance ways located circumferentially between each of said ribs and one of said teeth;

detent locking means associated with said socket arrangement being mounted in said body to be moveable towards and away from an advanced position, and means for moving said detent locking means towards said advanced position;

detent unlocking means carried by said body being manually moveable from an inoperative position to an operative position, said unlocking means upon movement thereof to said operative position being adapted to engage with withdraw said detent locking means from its advanced position;

wherein said detent locking means comprises an axially outwardly resiliently biased locking pin supported in one said connector tooth and operable to automatically engage a complementary aperture in the socket of the other coupling half when said pin is moved into register with such aperture, when the two coupling halves are joined;

and wherein said detent unlocking means comprises an annular ring supported on and extending around the circumference of said body to be angularly rotatable thereon, said ring being resiliently biased in one direction of rotation towards said inoperative position;

the arrangement being such that one said coupling half is connectable in axial alignment to the other coupling half be juxtaposition and interengagement between the complementary tooth structures and socket arrangements thereof to form the coupling, with each of said locking detent means being automatically moved to its advanced position once make-up of the coupling has been completed to block disengagement from the associated socket arrangement of the tooth structure of the opposed coupling half; disengagement of the two coupling halves requiring angular rotation of said two annular rings in opposite directions to withdraw said detent locking means of each coupling half.

2. A coupling according to claim 1 wherein each coupling half has two connector teeth, two entrance ways and two arcuate ribs, each arcuate rib and each arcuate protrusion being tapered so that the axial thickness thereof increases from a leading end to a trailing end, and wherein at the coupling longitudinal axis, and viewed in a plane normal thereto, each arcuate connector tooth subtends an angle of about 62°, each arcuate rib subtends an angle of about 53°, and each of said entrance ways subtends an angle of about 65°.

3. A coupling as claimed in claim 1 wherein each locking pin has a shaft in operative communication with the associated detent unlocking means such that with the coupling halves in the joined position, when each annular ring of the detent unlocking means is rotated to its operative position, the associated locking pins are withdrawn to permit relative uncoupling rotation of the coupling halves to be effected through manual engagement and rotation of said annular rings.

4. A coupling as claimed in claim 3 wherein each annular ring of the detent unlocking means is provided with an inclined ramp shoulder to cooperatively engage the associated locking pin when the annular ring is rotated.

5. A coupling as claimed in claim 4 wherein the locking pin has a smoothly rounded head that is slidably received in an axially extending counterbore in said body said head defining a shoulder adjacent the shaft, said shoulder forming a seat for one end of a compression spring that surrounds the shaft within said counterbore and urges said locking pin towards its advanced position.

* * * * *